(12) United States Patent
Schaenzer

(10) Patent No.: US 6,216,242 B1
(45) Date of Patent: Apr. 10, 2001

(54) MULTIPLE-TRACK MAGNETO-RESISTIVE CERTIFICATION AND THERMAL ASPERITY TEST HEAD

(75) Inventor: Mark James Schaenzer, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/226,780

(22) Filed: Jan. 6, 1999

Related U.S. Application Data

(60) Provisional application No. 60/070,769, filed on Jan. 8, 1998.

(51) Int. Cl.$^7$ .................................................. G11C 29/00
(52) U.S. Cl. ............................................. 714/723; 360/31
(58) Field of Search .................................... 714/723, 718; 360/31; 324/210, 212, 213

(56) References Cited

U.S. PATENT DOCUMENTS 5,822,139 * 10/1998 Ayabe .................................... 360/31

* cited by examiner

Primary Examiner—Phung M. Chung
(74) Attorney, Agent, or Firm—Edward P. Heller, III

(57) ABSTRACT

A combination multi-channel magneto-resistive (MR) certification and thermal asperity test head. The test head includes a MR stripe which has multiple taps which define multiple certification test MR stripe segments. Simultaneous connection of sensing logic to the multiple segments of the MR stripe allows for increased magnetic certification speed, and proper connection of sensing circuitry across appropriate taps on the MR stripe allows for testing for thermal asperities over a large portion of the disc surface. Various embodiments of the test head are disclosed.

2 Claims, 9 Drawing Sheets

MULTIPLE-TRACK MAGNETO-RESISTIVE CERTIFICATION AND THERMAL ASPERITY TEST HEAD

CROSS-REFERENCE TO RELATED APPLICATION

This application claims the benefit of U.S. Provisional Application Ser. No. 60/070,769, filed Jan. 8, 1998.

BACKGROUND OF THE INVENTION

This invention relates generally to the field of rigid magnetic disc drives, and more particularly, but not by way of limitation, to a test head configuration which is capable of both disc media magnetic certification and thermal asperity detection.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricatd using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches) or greater, the surface characteristics of the discs were adequate for the times.

Disc drives of the current generation incorporate heads that fly at nominal heights of only about $2.0\mu$", and products currently under development will reduce this flying height to $1.5\mu$" or less. Obviously, with nominal flying heights in this range, the surface characteristics of the disc medium must be much more closely controlled than was the case only a short time ago.

Industry demands for increasing data storage capacity are being met by increases in the areal density with which data are stored on the disc surfaces. The areal density of a disc drive product is defined as the mathematical product of the linear density (or number of bits recorded along the length of the data track), typically defined as "bits per inch", and the track density, measured radially across the disc and defined in "tracks per inch".

In order to increase the areal density at the current industry rate of approximately 60% per year, the track density is constantly being increased, and in order to accomplish this, the width of the operational read/write heads has steadily decreased, with current disc drive products incorporating heads having a width of 2.0 microns, 1.5 microns or less. It will be apparent to one of skill in the art that the decrease in track width leads, in turn, to a decrease in the size of an allowable disc media defect.

Each disc is statistically tested at the component level before being assembled into a disc drive. Magnetic defects are tested for in a process called "certification testing". During the disc certification process, a selected test signal is written to the disc and then read back. If the amplitude of the recovered signal falls below a predetermined level, a defect is recorded. Allowable defects are typically on the order of 33% of the intended track width. As the track widths decrease, so, too, does the size of allowable defects. With a 2.0 micron product track width, the allowable defect size is 0.7 microns. As the product track width decreases to 1.5 microns, the allowable defect size will be less than 0.5 microns.

The heads used to perform disc certification testing are referred to as "certification heads". During current certification testing, the certification heads cover nominally 35% of the disc surface. As the allowable defect size decreases, the width of the certification heads must also decrease accordingly, and the test time needed to maintain 35% coverage of the disc surface increases proportionally. As the time to certify each disc increases, the throughput of each individual test unit does down, in turn increasing the cost of certifying each disc. The currently acceptable certification time for each disc is one to two minutes.

With the incorporation of MR heads in disc drives and the decrease in head flying heights noted above, a new type of media defect called a thermal asperity, or TA, has become of concern to the industry. Such defects are referred to as "thermal" asperities because they cause non-data-related temperature variations in the MR element. These temperature variations result in resistance changes in the MR element, which in turn lead to read errors in the disc drive. Thermal asperities can be experienced in several modes, which will be discussed below.

The first mode in which TAs are exhibited can be referred to as "contact TAs". Contact TAs occur when actual physical contact occurs between the MR element of the MR head and a "high" spot on the disc surface. Such physical contact causes rapid frictionally-induced heating of the MR element, with an attendant large rapid change in the resistance of the MR element. A simplified representation of the component relationship that causes a contact TA, along with the resultant effect on the read data channel, are shown in FIGS. 1 and 2, respectively.

FIG. 1 shows a head slider 100 which includes a MR read element 102. This MR read element is sometimes referred to as a "MR stripe". The nominal surface of a disc is shown at 104, and the space 106 between the lower surface of the slider 100 and the nominal disc surface 104 represents the flying height of the slider 100. The relative sizes shown for the slider 100, MR stripe 102 and flying height 106 are not to scale and are for purposes of discussion only.

In the figure, the disc is moving relative to the slider 100 in the direction shown by arrow 108.

As the disc rotates beneath the slider 100, a high spot 110 on the disc surface passes under the MR element 102. The vertical height of the high spot 110 is large enough that contact occurs between the disc and the MR element 102. This contact causes frictionally-induced heating of the MR element 102. As is well known in the art, such heating of the MR element 102 results in a proportional increase in the resistance of the MR element 102 local to the point of contact. The effect of this frictionally-induced heating and resistance change is illustrated in FIG. 2.

As is known in the industry, a constant bias current is applied across the MR element of a MR head. In normal operation, any change in the magnetic flux on the disc surface which passes below the MR element causes a corresponding change in the resistance of the MR element. The change in resistance, in turn, causes a change in the voltage across the MR element, and this change in voltage is sensed by the data read channel.

FIG. 2 shows the nominal voltage across the MR element as a result of the bias current at 112. As can be seen in the figure, when the high spot 110 on the disc surface contacts the MR element 102, a large voltage spike 114, sometimes referred to as a "super pulse", occurs in the read data channel. The relationship between the change in temperature of the MR element and the change in voltage sensed by the read data channel can be expressed by the following relationship:

$$\delta V_{TA} = i \delta R_{TA} = iR \cdot \beta \cdot \delta T_{TA}$$

wherein $\delta V_{TA}$=the change in sensed voltage due to the TA,
  i=the constant bias current
  $\delta R_{TA}$=the change in resistance of the MR element due to the TA,
  R=the nominal resistance of the MR element,
  $\beta$=the thermo-resistance coefficient of the MR element material, and
  $\delta T_{TA}$=the temperature change due to the TA.

The voltage spike 114 has a very rapid rise time (on the order of 20–100 nanoseconds), and returns to its normal level over a relatively long time interval (on the order of a microsecond). This rapid rise and gradual decay of the voltage spike is indicative of the rapid rise in temperature induced by friction when the high spot 110 contacts the MR element 102, and the gradual dissipation of the frictionally-generated heat from the MR element to surrounding elements of the disc drive, as will be discussed in more detail below.

The effect of the thermally-induced voltage spike 114 on the electronics of the read data channel can be best appreciated when a comparison is made between the amplitude of the voltage spike 114 due to the contact TA and the amplitude of normal voltage variations due to magnetically-induced resistance changes caused by data recorded on the disc.

FIG. 2 shows a sine wave 116 which represents the voltage variation sensed in the read data channel as a result of a magnetically recorded constant frequency data signal. As can be seen, this normal data read signal 116 is referenced to and centered on the normal read channel voltage reference 112, and has a nominal voltage range represented by arrow 118. The read data channel logic would, therefore, be optimized to respond to and distinguish voltages within the nominal magnetic-data-induced voltage range 118.

As can be seen in the figure, the thermally-induced voltage spike 114 is significantly greater in amplitude than the nominal data voltage range 118, and the data signal 116 riding the voltage spike 114 far exceeds the expected range of voltage variation. Such a large voltage spike can be expected to saturate the read data channel logic, and, since the voltage spike endures for several cycles of recorded data, be further expected to result in several bits of "lost" data.

While the high spot 110 shown in FIG. 1 is illustrated as an integral part of the disc surface, it will be appreciated by those of skill in the art that similar contact and data recovery losses can result if the high spot 110 were to be instead a particulate contaminant of comparable size which adhered to the disc surface and passed under and contacted the MR element. It is, therefore, common in the industry to refer to contact TAs that result from integral high spots in the disc surface, such as the high spot 110 of FIG. 1, as "native" TAs, while contact TAs that result from particulate contamination after manufacture are referred to as "grown" TAs, resulting from post-manufacture particulate contamination of the disc surface.

Another mode in which thermal asperities are exhibited will be referred to as "non-contact" TAs, and will be discussed below. However, before such non-contact TAs are discussed, it is necessary to further discuss the normal conditions present in a disc drive incorporating MR heads.

FIG. 3 represents the normal relationship between various elements of the disc drive system, and shows a portion of a slider 120 incorporating a MR element 122. Once again, the relative size of the various elements of the drawing are not to scale, and have been selected for illustrative purposes only. As previously mentioned, during normal operation, a constant bias current is applied across the MR element 122. The application of this bias current results in heating of the MR element. Typical MR heads also include thermally conductive shield elements 124, 126, which may also be functional elements of the inductive write element of the head.

When the slider 120 is in its intended relationship with a disc surface 128, an air gap 130 exists between the slider 120 and the disc surface 128.

The heat generated in the MR element 122 by the application of the bias current dissipates to the shield elements 124, 126, and, to a lesser extent, across the air gap 130 to the disc as shown by arrows 132 and 134 respectively. In actuality, approximately 98% to 99% of the heat generated by the bias current in the MR element 122 is dissipated through the shield elements 124, 126, while approximately 1% to 2% of the heat is conducted across the air gap 130 and into the disc. As will be apparent to one of skill in the art, since a constant bias current is applied to the MR element 122, a state of thermal equilibrium will quickly be thus attained, allowing effective recovery of previously recorded data as a result of magnetically-induced resistance changes in the MR element 122.

Non-contact TAs occur as a result of changes in the just described thermal equilibrium, and can be exhibited in either of two modes. These two non-contact TA types will be referred to as "positive non-contact TAs" and "negative non-contact TAs" and discussed in turn below.

Turning now to FIG. 4, shown is a slider 140 incorporating a MR element 142. The slider 140 is shown flying above a disc surface 144. The nominal air gap between the slider 140 and the disc surface 144 is designated 146. When the slider 140, disc surface 144 and air gap 146 are in their nominal relationship, the thermal equilibrium described above in relationship to FIG. 3 exists. As can be seen in FIG. 4, however, a low spot 148 in the disc surface 144 is passing under the MR element 142 as the disc moves relative to the slider 140 in the direction shown by arrow 150.

As the low spot 148 in the disc surface 144 passes under the MR element 142, the distance between the MR element 142 and the disc surface increases. This increase in spacing between the MR element and the disc reduces the effectiveness of the heat dissipation between the MR element 142 and the disc which was designated as the thermal dissipation path 134 in FIG. 3. Since less heat is able to dissipate from the MR element 142 to the disc, the overall temperature of the MR element 142 rises, causing an increase in its resistance. This increase in MR element temperature will continue until either a new thermal equilibrium level is reached, or until the low spot 148 completely passes the MR element 142, at which time the overall temperature of the MR element will return to its original equilibrium level.

The effect of such a low spot 148 passing under the MR element 142 is shown in FIG. 5. In FIG. 5, the nominal non-active voltage level sensed by the read data channel as a result of thermal equilibrium is shown at 152. As seen at 154, however, as the low spot 148 of FIG. 4 begins to pass below the MR element, the voltage level begins to rise. This is a result of the increase in resistance in the MR element brought about by the increase in temperature of the MR element due to a decrease in the amount of heat dissipated to the disc from the MR element. Curve 156 shows the voltage level change as the low spot 148 of FIG. 4 passes under the MR element 142, and illustrates the return to the nominal voltage level 152 once the low spot passes beyond the MR element 142. A person of skill in the art will appreciate that, if a voltage variation representative of magnetically-induced data recovery—such as that shown at 116 in FIG. 2—were referenced to the voltage curve 156 caused by the low spot 148, the resultant signal would once again exceed the operational range of the read data channel logic, resulting in saturation of the data recovery logic and loss of any data during the period of the voltage spike 156. It is because the low spot 148 in the disc surface causes a positive voltage spike in the read data channel without direct contact between the disc and the MR element that this type of TA is referred to as a "positive non-contact TA".

FIGS. 6 and 7 illustrate the cause and result of a negative non-contact TA. In FIG. 6, a slider 170 incorporating a MR element 172 is shown flying above a disc surface 174 at a nominal flying height represented by the air gap 176 between the slider 170 and the disc surface 174. A high spot 178 in the disc surface passes under the MR element 172 as the disc rotates past the slider 170 in the direction of arrow 180. The high spot 178 has a vertical height relative to the nominal disc surface 174 which is less than the vertical dimension of the air gap 176 between the slider 170 and the disc surface 174, so that no direct contact between the MR element 172 and the high spot 178 occurs.

As the high spot 178 passes beneath the MR element 172, however, the air gap between the MR element 172 and the disc 174 is reduced, bringing the MR element 172 and the disc 174 into closer proximity. This increase in proximity allows a greater than normal amount of heat to be dissipated from the MR element to the disc, resulting in sudden increased cooling of the MR element 172. As the temperature of the MR element 172 falls, its resistance also decreases by a proportional amount. The effect of this sudden decrease in the resistance of the MR element is illustrated in FIG. 7.

In FIG. 7, numeric reference 182 represents the nominal voltage level sensed by the read data channel when the thermal equilibrium previously discussed exists and no previously recorded magnetic data are influencing the MR element. As the high spot 178 of FIG. 6 passes under the MR element 172, the increased heat dissipation and attendant reduction in resistance of the MR element 172 causes a sharp reduction in the voltage sensed in the read data channel until the high spot 178 completely passes the MR element 172 and thermal equilibrium is again attained. This causes the negatively-going voltage spike 184 of FIG. 7.

If, once again, it is envisioned that a varying voltage level, such as that designated 116 in FIG. 2, representative of recovered magnetic data is referenced to the signal 182 of FIG. 7, it is apparent that any such signal occurring during the negative pulse 184 would be expected to fall below the threshold level necessary to allow reliable data recovery, and thus cause data loss during the time interval that the high spot is passing below the MR element. It is from the negative voltage spike induced by this non-contacting variation in the disc surface that the designation "negative non-contact TA" derives.

It is a common practice in the industry to test for defects in the disc surface using precision glide test units. Such testing is performed on the discs at the component level before the discs are assembled into a disc drive, and typically involves flying a special test head at a height above the disc surface which is approximately half of the nominal flying height intended for the finished disc drive. Glide test units typically utilize linear actuators to move the test heads radially across the surface of the disc under test in order to eliminate the effects of the skew angle changes inherent in the rotary actuators commonly used in current disc drive products.

One commonly utilized test head used for glide testing of discs includes a hydrodynamic slider unit which mounts a piezoelectric crystal, hereinafter referred to as a piezo element. When a defect on the surface of the disc being tested rotates under the slider, the slider and piezo element are distorted by contact between the head and the defect on the disc, and a small voltage is generated by the piezo element as a result. Correlation of these induced voltage spikes to the actuator position and the rotational position of the disc allows a mapping of the defects on the disc surface.

Glide test heads which incorporate a piezo element cannot detect all non-contact thermal asperities, however, since some thermal asperities will not be of sufficient size to cause excitation of the test head body or the piezo element. Therefore, other means must be found to detect the presence of all thermal asperities in disc media.

One method currently used to test for TAs involves the use of a normal read/write head incorporating a MR element flown at approximately the flying height intended for the disc drive in which the disc will be incorporated. When the MR element passes one of these TAs, temperature changes in the MR element, caused as described above, induce corresponding changes in the resistance of the MR element. The change in resistance induced by thermal asperities is detectable using electronic circuitry similar to currently employed data read channels for MR heads, and, therefore, these defects can also be mapped, using actuator and spindle position correlation as will be described below.

The main drawback to the use of standard production MR heads for media defect testing is the fact that the MR elements in such heads are dimensioned to sense data recorded at current data densities. This, in turn, means that the test unit must move the test head across the disc in such small steps that the testing time for a single disc surface is unacceptably long. There is also a low but significant risk that the MR element will be damaged during such testing, thus increasing labor and parts cost.

Co-pending U.S. patent application Ser. No. 08/855,142, filed May 13, 1997 and assigned to the assignee of the present application describes a wide thermo-resistive (TR) sensor useful for detecting the presence of thermal asperities. The material of this wide TR sensor element is specially selected to optimize sensitivity to thermal asperities, and is 40 to 50 times as wide as a normal MR element in a MR read/write head. When incorporated in a glide test head, the wide TR element thus allows rapid testing of an entire disc surface for the presence of thermal asperities. Such heads are, however, inherently incapable of performing magnetic disc certification, since they are optimized for thermo-resistive sensing and thus have little or no sensitivity to magnetic changes on the disc surface. Furthermore, the extreme width of such heads precludes their use for detecting data recorded at current track densities.

A need clearly exists, therefore, for a test head which is capable of both magnetic certification and thermal asperity detection for magnetic disc recording media, and for a test head which improves the testing time for each disc.

SUMMARY OF THE INVENTION

The present invention is a combination multi-channel magneto-resistive (MR) certification and thermal asperity test head. The test head includes a MR stripe which has multiple taps which define multiple MR stripe portions. Simultaneous connection of sensing logic to multiple portions of the MR stripe allows for increased magnetic certification speed, and proper connection of sensing circuitry across appropriate taps on the MR stripe allows for testing for thermal asperities over a large portion of the disc surface. Various embodiments of the test head are disclosed.

The manner in which the present invention is implemented, as well as various features, benefits and advantages of the invention, can best be understood by a review of the following Detailed Description of the Invention, when read in conjunction with an examination of the accompanying drawings.

DETAILED DESCRIPTION OF THE INVENTION

Figure 8:
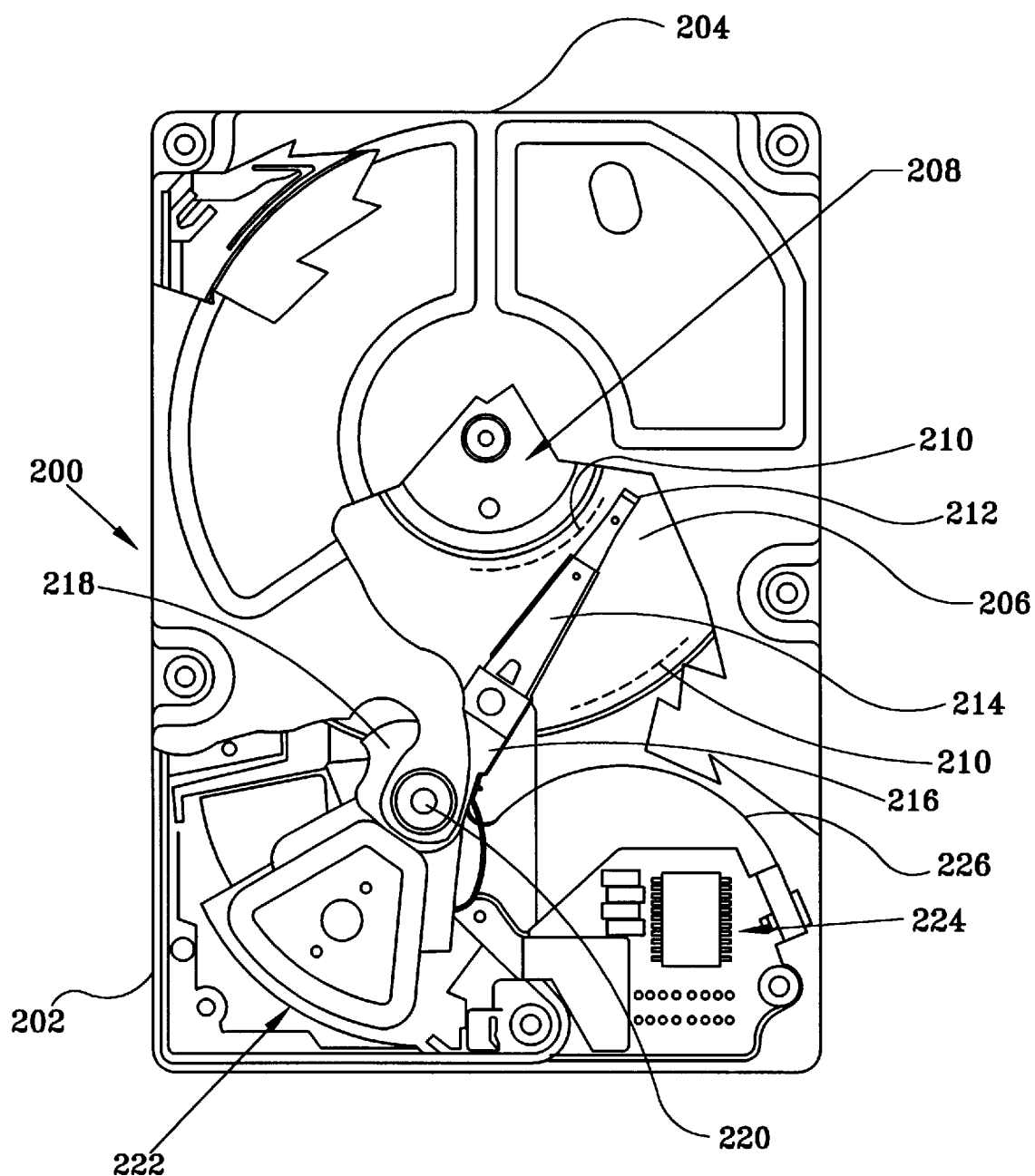
FIG. 8 is a top plan view of a prior art disc drive which incorporates discs which can be tested using the test head of the present invention.

Turning now to the drawings and specifically to FIG. 8, shown is a plan view of a disc drive 200 which incorporates discs of the type which can be certified and tested for the presence of thermal asperities using the test head of the present invention. The disc drive 200 includes a base member 202 to which all other components are directly or indirectly mounted and a top cover 204 (shown in partial cutaway) which, together with the base member 202, forms a disc drive housing which encloses delicate internal components and isolates these components from external contaminants.

The disc drive includes a plurality of discs 206 which are mounted for rotation on a spindle motor shown generally at 208. The discs 206 include on their surfaces a plurality of circular, concentric data tracks, the innermost and outermost of which are shown by dashed lines at 210, on which data are recorded via an array of vertically aligned head assemblies (one of which is shown at 212). The head assemblies 212 are supported by head suspensions, or flexures 214, which are attached to actuator head mounting arms 216. The actuator head mounting arms 216 are integral to an actuator bearing housing 218 which is mounted via an array of precision ball bearing assemblies (not designated) for rotation about a pivot shaft 220.

Power to drive the actuator bearing housing 218 in its rotation about the pivot shaft 220 is provided by a voice coil motor (VCM) shown generally at 222. The VCM 222 consists of a coil (not separately designated) which is supported by the actuator bearing housing 218 within the magnetic field of an array of permanent magnets (also not separately designated) which are fixedly mounted to the base member 202, all in a manner well known in the industry. Electronic circuitry (partially shown at 224, generally, and partially carried on a printed circuit board (not shown)) to control all aspects of the operation of the disc drive 200 is provided, with control signals to drive the VCM 222, as well as data signals to and from the heads 212, carried between the electronic circuitry 224 and the moving actuator assembly via a flexible printed circuit cable (PCC) 226.

It will be apparent to one of skill in the art that the proper operation of the disc drive 200 will depend in large part to the existence of a controlled, precise relationship between the head assemblies 212 and the discs 206. Therefore, it is common in the industry to test each of the discs 206 included in the disc drive 200 before the discs 206 are assembled into a disc drive 200.

Figure 9:
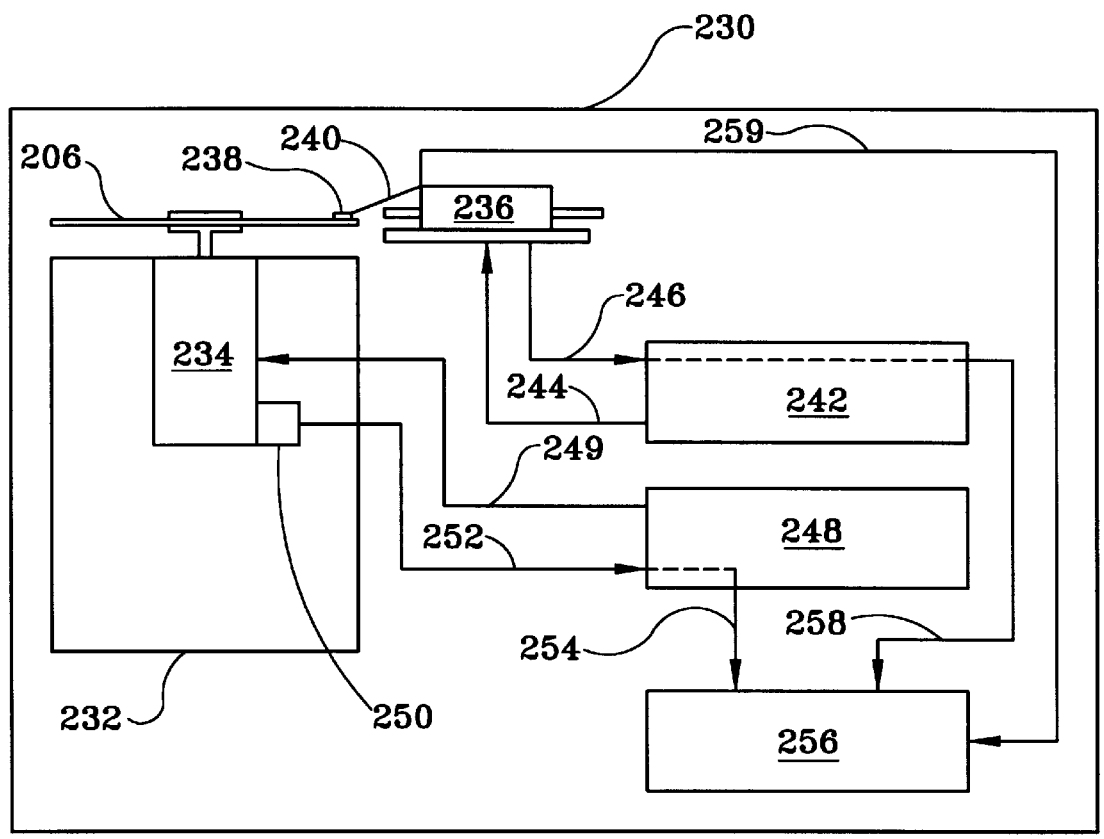
FIG. 9 is a simplified functional block diagram of a test unit in which the present invention can be incorporated.

FIG. 9 is a simplified functional block diagram of a typical prior art test unit 230 used to test and map the surface of recording discs as components before the discs are assembled into disc drive units. The test unit 230 includes a precision spin stand 232 which further includes a spin motor 234 on which the disc 206 is mounted for rotation and testing.

The test unit 230 also typically includes a linear actuator 236 which is used to controllably move a test head 238, mounted on a head suspension 240, on a linear path across a radius of the disc 206. Actuator control logic 242 is also included in the test unit 230 and provides the control signals on signal path 244 needed to move the test head 238 and monitors, via signal path 246, the position of the test head 238 during testing of the disc 206. In a typical test unit of the current art, the actuator supports and controls a second test head for simultaneous testing of the second disc surface. For purposes of clarity, the figure shows only a single test head 238.

The test unit 230 also includes spin motor control logic 248 which is used to accelerate the spin motor 234 to its intended testing speed by passing motor drive signals via path 249. It is common practice in the industry to vary the speed of the spin motor 234 as the test head 238 is moved across the disc radius to provide a constant linear velocity between the test head 238 and the area of the disc being tested. That is, as the test head 238 is moved inward, the speed of the spin motor is increased proportionally to maintain a constant linear velocity, and thus maintain a constant flying height for the test head 238.

The spin stand 232 also includes a spin motor position detection element 250 which provides a rotational position reference signal. This reference signal is carried over signal path 252 to the spin motor control logic 248 where it is used to assist in the control of the speed of the spin motor 234. The reference signal is also passed via signal path 254 to defect mapping logic 256, where it is utilized, along with the actuator position signal passed via signal path 258 by the actuator control logic 242, to maintain a constant calculation of the radial and circumferential portion of the disc 206 that is located under the test head 238.

During the testing operation, a disc 206 is mounted on the spin motor 234 and the spin motor 234 is brought up to operational speed by the spin motor control logic 248. Once the spin motor 234 is at the proper speed, the actuator control logic 242 causes the actuator 236 to move the test head 238 into cooperative arrangement with the surface of the disc 206. The test head 238 is then stepped across the spinning disc 206 at a rate selected to cause the test head 238 to pass over every portion of the disc surface. As the head is stepped across the disc surface, the spin motor control logic 248 varies the spin motor speed to maintain a constant relative linear velocity between the test head 238 and the disc area being tested as noted above.

A defect on the disc surface will cause the test head 238 to generate a defect detection signal which is passed to the defect mapping logic 256 via signal path 259. Recognition of the defect detection signal by the defect mapping logic 256 results in the current radial and circumferential location of the test head 238 relative to the disc 206 being recorded. Once the test head 238 has passed over the entire usable radial extent of the disc 206, all detected and recorded defects are correlated to produce a defect map of the entire disc surface.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

Figure 10:
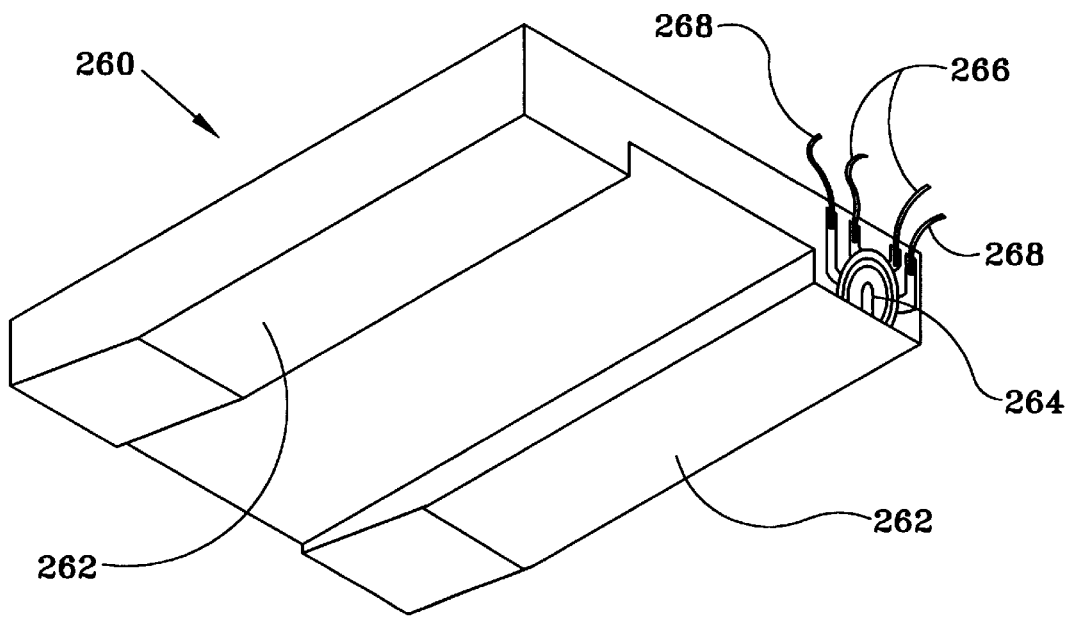
FIG. 10 is a simplified perspective view of a typical prior art magneto-resistive read/write head, such as is incorporated in disc drive products.

Turning now to FIG. 10, shown is a simplified bottom perspective view of a typical MR read/write head 260, such as the type that is incorporated in a finished disc drive, or can be used as a certification head for magnetic certification of disc media at the component level. As previously mentioned, MR read/write heads such as this can also be used to detect thermal asperities, although the narrow gap width frequently makes such a use economically infeasible.

As the figure shows, the MR head 260 includes an arrangement of air bearing surfaces 262, which interact with a thin layer of air dragged along by the spinning disc to hydrodynamically fly the MR head 260 above the surface of the disc. The particular height at which the MR head 260 flies, and the roll and pitch attitude at which it operates, are a function of both the linear velocity between the spinning disc and the head 260, and the flexure, or head suspension, (214 in FIG. 8) used to mount and support the MR head.

While the MR head 260 of FIG. 10 is of the type referred to as a "catamaran" head, other forms of air bearing surface arrangements are know in the art, including "tri-pad" and "negative pressure" air bearing arrangements. The particular type of air bearing arrangement associated with the present invention is not considered as limiting to the scope of the invention.

FIG. 10 also shows a MR transducer assembly 264 formed at the trailing edge of one of the air bearing surfaces 262. As is known to those of skill in the art, a typical MR transducer assembly includes an inductive write element (not separately labeled) and a magneto-resistive read element (also not separately designated). Because the MR transducer includes these two, separate elements, a MR head requires two pairs of signal lead connections: a first pair of lead connections 266 for the inductive write element, and a second pair of lead connections 268 for the magneto-resistive read element.

As is also known to those of skill in the art, the inductive write element lead connections 266 carry direct current (dc) pulses of appropriate polarity to induce magnetic flux reversals on the surface of the disc reflective of the data being recorded, while the MR lead connections 268 supply a fixed dc bias current across the MR stripe. The magnetic flux reversals recorded on the disc cause resistive changes in the MR element which can be sensed as proportional variations in the voltage measured across the MR element lead connections 268.

Since the MR head 260 is of the type that will be used in the finished disc drive product, it is also capable of use for disc certification, i.e., testing for magnetic recording performance.

While the MR head 260 can also be used to detect thermal asperities, as noted above, the narrow width of the MR element—essentially the width of the data tracks to be recorded on the disc—makes the use of a normal MR read/write head, such as the MR head 260, less than optimum for thermal asperity detection, since it would have to be stepped across the disc in increments no wider than the width of the MR element in order to detect all thermal asperities.

The test head of the present invention provides both the magnetic certification capability of the MR read/write head 260 with an improved thermal asperity detection capability, as will be discussed below.

Figure 11:
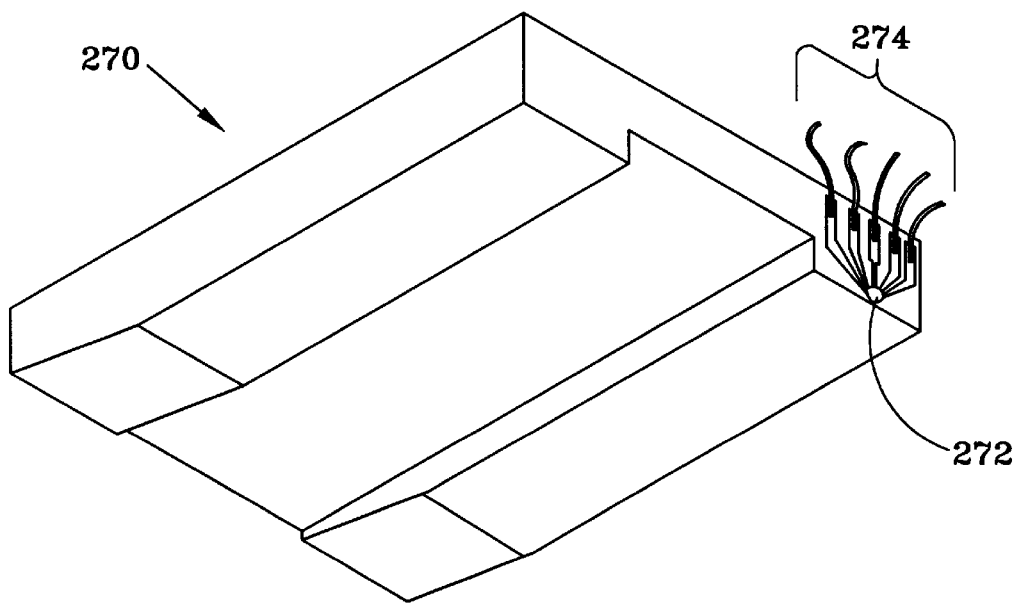
FIG. 11 is a simplified perspective view of a first embodiment of the test head of the present invention.

FIG. 11 is a simplified bottom perspective view, similar to that of FIG. 10, of a first embodiment of the test head 270 of the present invention. Once again, the test head 270 is shown with a catamaran-type air bearing arrangement, but the scope of the present invention is envisioned to encompass test head assemblies having other air bearing structures, as well.

As can be seen in FIG. 11, the test head 270 of the present invention includes a novel transducer configuration 272, which facilitates the functionality of the test head for use as both a magnetic certification head and a thermal asperity detection head. As shown in the figure, the test head 270 of the present invention includes five lead connections 274 in the example embodiment shown. The function of each of the lead connections is discussed below.

Figure 12:
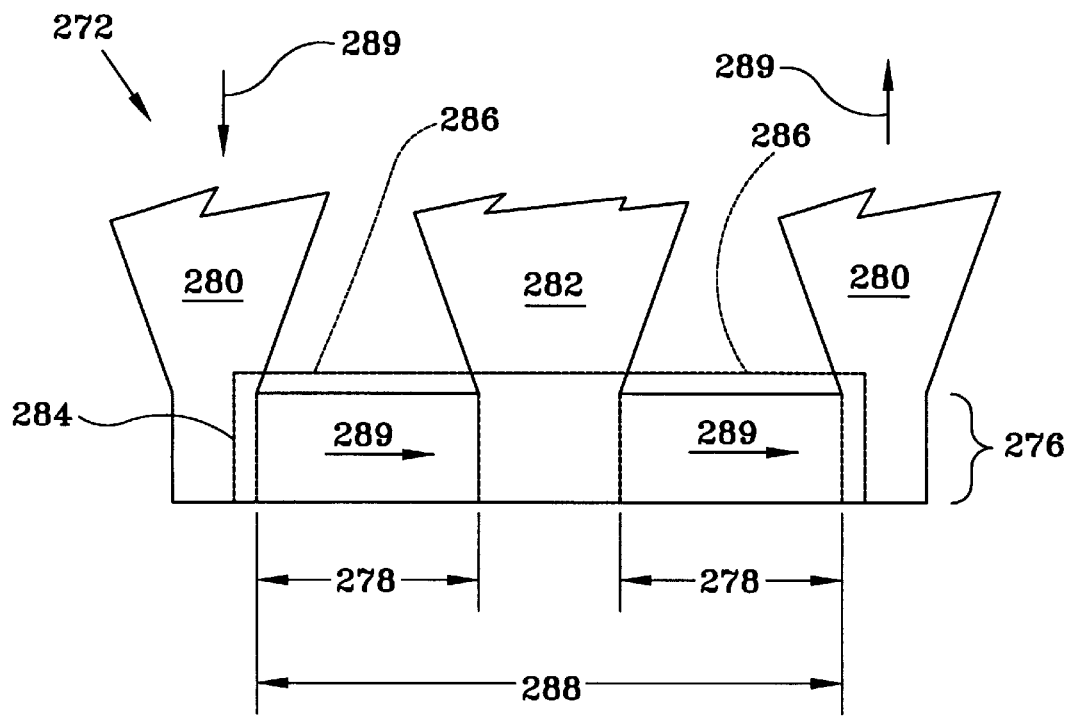
FIG. 12 is a simplified detail elevation view of the functional elements of the test head of FIG. 11.

FIG. 12 is a simplified elevation view of the transducer configuration 272 of the first embodiment of the test head 270 of the present invention. The transducer configuration 272 includes a magneto-resistive, or MR, stripe 276 which is partitioned into a pair of MR segments 278 by the presence at the ends of the MR stripe 276 of a pair of discrete lead connections 280, and the presence in the middle of the MR stripe 276 of a central lead connection 282. As presently envisioned, the transducer configuration 272 also includes a single wide inductive write element, shown generally by dashed lines at 284, which is capable of writing magnetic transitions to the disc over a width equivalent to several track widths in the disc drive in which the disc is intended for use. Since the inductive write element 284 requires two lead connections 286, the two inductive write element lead connections 286 and the three MR element lead connections 280, 282 total to the five lead connections 274 shown in FIG. 11 for this embodiment of the present invention.

The present invention also envisions that the width of the MR segments 278 defined between adjacent lead connections 280, 282 will be substantially equal to the width of the data tracks in the disc drive in which the disc being tested is intended for use.

Since the inductive write element 284 is capable of writing magnetic flux transitions across several of the intended data track widths, and the MR segments are capable of recovering data recorded at the intended track widths, the transducer configuration 272 of FIG. 12 can perform the function of magnetic certification on a disc surface area equal to two data track widths at one time, thus decreasing the time needed for magnetic certification testing, and lowering overall disc drive costs.

In FIG. 12, a constant bias current is provided by inputting the bias current at the left discrete lead connection 280 and providing a return path at the right discrete lead connection 280, as shown by arrows 289. This causes the bias current to pass through the MR segments 278 from left to right, as also shown by arrows 289. During the read-back portion of the magnetic certification test, any previously recorded magnetic flux reversals which pass beneath the MR segments 278 will result in resistance changes across the MR segments 278 which are readily detectable by sensing circuitry connected across the discrete lead connections 280 and the central lead connection 282, as will be discussed in more detail hereinbelow. One of skill in the art will appreciate that the direction of bias current flow can be reversed if appropriate changes are made to the associated sensing circuitry, without exceeding the intended scope of the invention.

Since the constant bias current is applied across the entire effective width 288 of the MR stripe 276, any thermal asperity which passes beneath the MR stripe effective width 288 will also be detected as a large resistance change somewhere along the effective width 288. Since, as previously discussed above, the resistance change caused by a thermal asperity is much greater in magnitude than a resistance change in response to magnetic changes on the disc being tested, a thermal asperity can be expected to cause either saturation of one or more of the sensing circuits associated with each MR segment 278, or failure to rise to the sensing threshold of those circuits.

Figure 13:
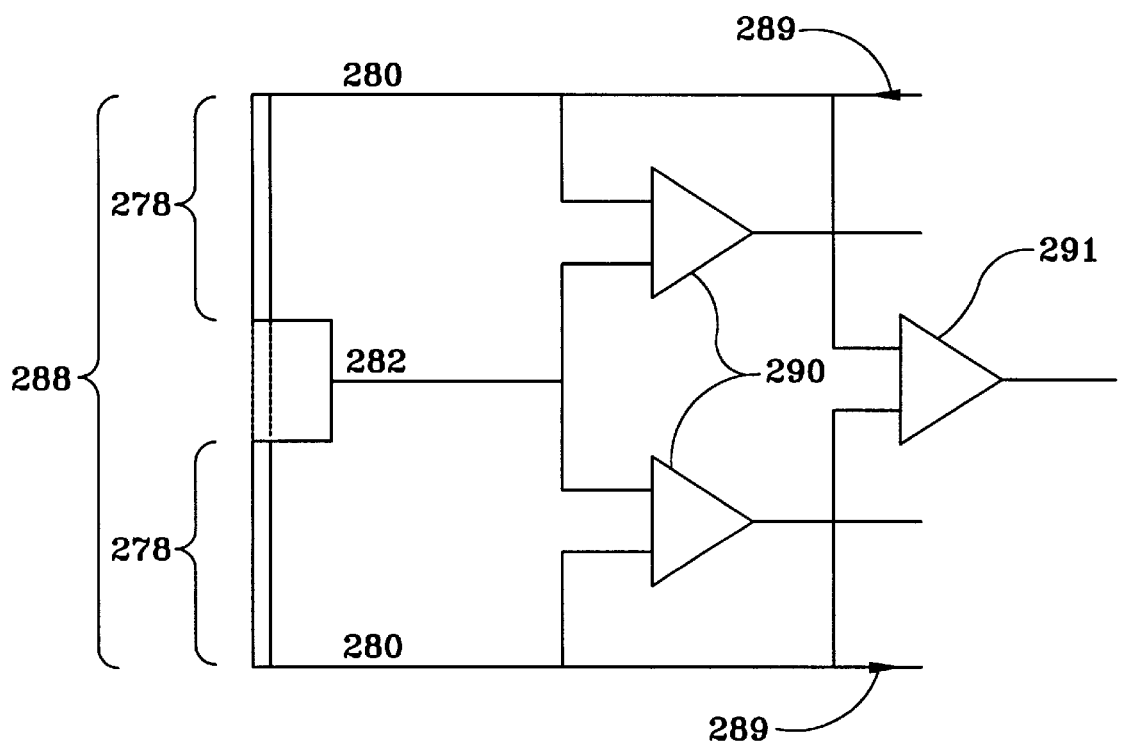
FIG. 13 is a simplified functional block diagram of electronic sensing circuitry which can be used with the embodiment of the test head of the present invention of FIG. 12.

FIG. 13 is a simplified block diagram of electronic sensing circuitry which can be used with the first embodiment of the transducer configuration 272 of FIG. 12.

FIG. 13 shows the MR segments 278 used for the readback function of the magnetic certification testing. The inductive write element (284 in FIG. 12) has been omitted in FIG. 13 for clarity. The direction of bias current flow is again noted by arrows 289, and in FIG. 13 would thus be from top to bottom across each of the MR segments 278 used for magnetic certification, as well as across the entire MR effective width 288 used for thermal asperity detection.

FIG. 13 also shows a differential amplifier 290 connected across each of the MR segments 278 used for magnetic certification. The outputs of these differential amplifiers 290 would each be connected to read data channel logic (not shown) similar to that used for data read operations in a finished disc drive, and, as such would be usable for monitoring the quality of magnetic recording performance on the disc under test.

One of skill in the art will also appreciate that, if a thermal asperity passes beneath any portion of the entire effective width 288 of the MR stripe, a "super pulse" would be detected which, as described above, would be expected to either over-drive and saturate the read channel logic, or reduce the amplitude of the read-back signal to below the threshold sensing level of the read data channel logic. Thus, the test head of the present invention can be used for simultaneous magnetic certification testing and thermal asperity detection, with detection of a "super pulse" in the read data channel being interpreted as indicative of the presence of a thermal asperity.

If desired, an optional differential amplifier 291 can be connected across the entire effective width 288 of the MR stripe and connected to thermal asperity detection logic (not shown) which would monitor for the detection of only thermal asperities across the entire effective width 288 of the MR stripe. Such secondary detection circuitry can be compared to the outputs of the differential amplifiers 290 to further enhance the test system's capability for detection of thermal asperities.

One of skill in the art will appreciate that if the test head 270 of FIG. 11 with the transducer configuration 272 of FIG. 12 were to be used in a test unit, such as the test unit 230 in FIG. 9, the disc under test can be certified for magnetic recording performance and tested for the presence of thermal asperities with the same test head. That is, if the inventive test head 270 were substituted for the test head 238 in the test unit 230 of FIG. 9, at each step of the linear actuator 236, the test head 270 is capable of performing magnetic certification of two data tracks during two disc revolutions—one revolution to write the test data pattern, and a second to read back the recorded data pattern with the two MR elements 278, while simultaneously monitoring for the presence of thermal asperities, as indicated by the detection of "super pulses" in either the read data channel circuitry associated with each of the MR segments 278 or in the detection circuitry associated with the entire effective width 288 of the MR stripe.

Table 1 below shows the relationship between the nominal track width of a disc drive product, the width of the MR stripe segments used for certification and thermal asperity detection, and the step size which would be incorporated in a test system, such as that of FIG. 9, to achieve a 30% coverage of the disc surface for certification and a 50% coverage of the disc surface for thermal asperity detection.

TABLE 1

| Nominal disc drive Trackwidth (also width of MR segments 278) | Thermal asperity test width (also width of MR stripe 288) | Actuator step size ($\mu M$) |
| --- | --- | --- |
| 3.0 | 18 | 30 |
| 2.5 | 15 | 25 |
| 2.0 | 12 | 20 |
| 1.5 | 9 | 15 |

In Table 1, the widths of the nominal tracks for a disc drive, as well as the widths of effective certification MR stripe segments (278 in FIG. 12) and thermal asperity test segments (288 in FIG. 12) are given in $\mu$meters. As will be noticed in the table, as the nominal size of the data tracks on the disc decreases, so, too, does the size of the actuator step used for testing, which, in turn, leads to increased testing time to maintain the same level of disc surface coverage. It will also be evident to one of skill in the art that the coverage provided by the test head of the present invention can be increased by proper modification of the actuator step size used for testing.

One of skill in the art will also appreciate that the transducer configuration of FIG. 12 is readily replicated for additional test performance enhancement. An example of such a replicated transducer configuration is shown in FIG. 14.

Figure 14:
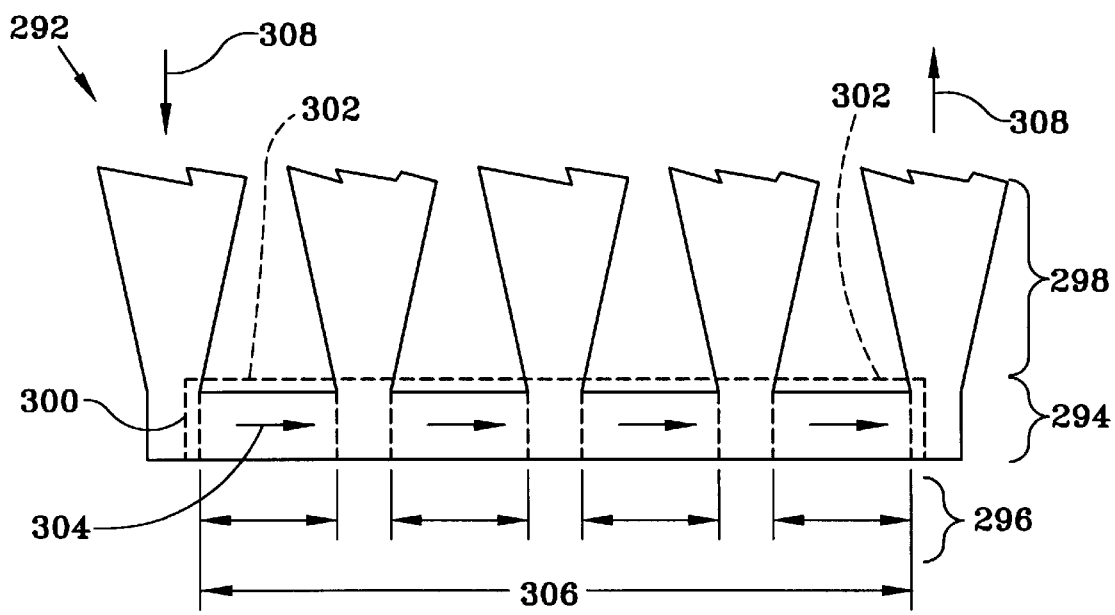
FIG. 14 is a simplified detail elevation view of the functional elements of a second embodiment of the test head of the present invention.

FIG. 14 is a simplified elevation view of a transducer configuration 292 which forms a second embodiment of the test head of the present invention.

In FIG. 14, a MR stripe 294 is shown, which is divided into a plurality of functional MR segments 296 by the inclusion of a plurality—five in the example embodiment shown—of lead connections 298. Associated with the functional MR segments 296 is a wide inductive write element, designated by dashed lines at 300. An examination of FIG. 14 reveals that the wide inductive write element also requires two lead connections 302. Thus, the transducer configuration 292 shown requires seven lead connections.

Once again, the transducer configuration of FIG. 14 is capable of both magnetic certification and thermal asperity detection.

Constant dc bias current is provided across the MR segments 296 by providing a current path designated by arrows 308. That is, current is input to the transducer configuration 292 on the left outermost lead connection 298, and a return path is provided on the right lead connections 298. The direction of current flow through the MR segments 296 would thus be as shown by arrows 304. If, as envisioned by the present invention, each of the MR segments 296 has a width equivalent to that of a comparable single MR read/write head, such as that of FIG. 10, the transducer configuration 292 of FIG. 14 is capable of simultaneous certification of four data tracks on the disc surface, again reducing the time to magnetically certify a disc.

The constant dc bias current is thus also applied across the entire effective width 306 of the MR stripe 294 lying between the two outermost lead connections 298, by providing a current path as shown by arrows 308. Thus, the transducer configuration 292 of FIG. 14 provides a test head capable of testing for the presence of thermal asperities over a portion of the disc surface equal to four adjacent data tracks and the areas between the fours data tracks, again contributing to a reduction in disc testing time.

Figure 15:
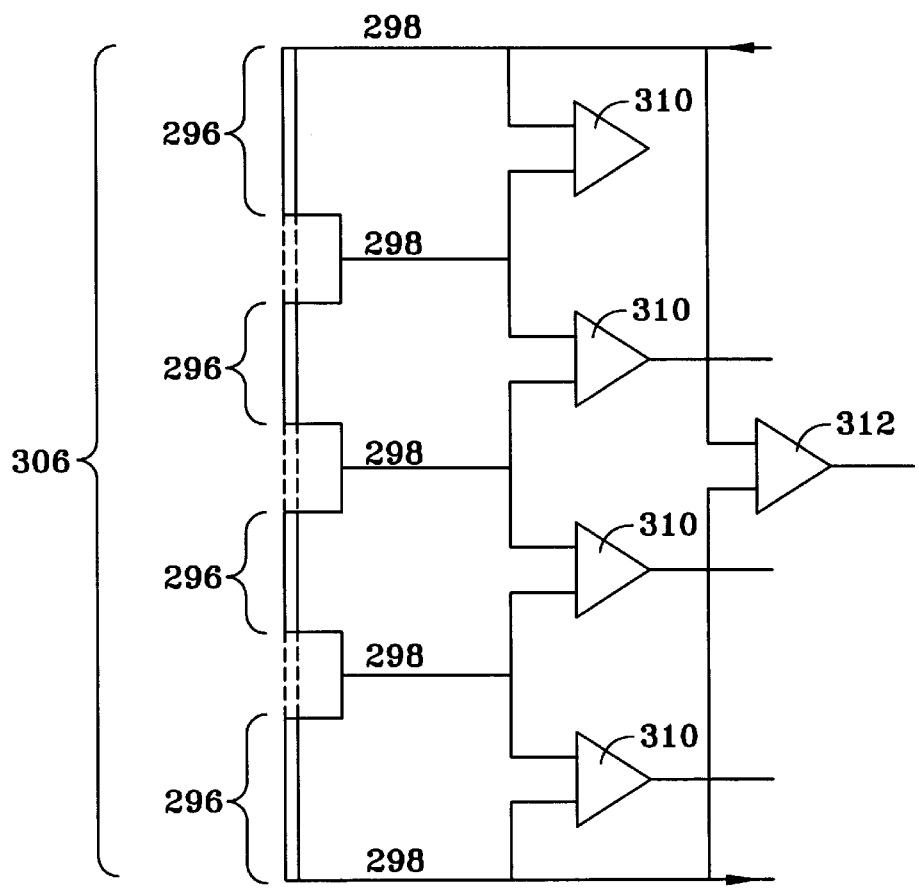
FIG. 15 is a simplified functional block diagram of electronic sensing circuitry which can be used with the second embodiment of the test head of the present invention of FIG. 14.

FIG. 15 is a simplified functional block diagram of electronic circuitry which can by used with this second embodiment of the present invention. In particular, the block diagram of FIG. 15 shows a circuitry configuration capable of use with the transducer configuration 292 of FIG. 14.

FIG. 15 shows the four certification MR segments 296. The associated wide inductive write element (300 in FIG. 14) is not shown for purposes of clarity.

Once again, each of the certification MR segments 296 has an associated differential amplifier 310 connected across its width using the appropriate lead connections 298. These differential amplifiers 310 are, in turn, connected to read data channel logic similar to that employed for data recovery in the disc drive in which the disc being tested is intended for use. Since a known data pattern is written to the disc under test by the inductive write element (300 in FIG. 14), a comparison between the recovered data and the known recorded data provides a confidence factor useful for magnetic certification of the disc.

During the certification process, the circuitry to which the differential amplifiers 310 are attached also monitors for the presence of "super pulses" detected by the certification MR segments 296, such as would be caused by a thermal asperity passing beneath the certification MR segments 296. As also noted above, a secondary differential amplifier 312 can also be connected across the entire effective width 306 of the MR stripe (294 in FIG. 14) to further aid in detection of thermal asperities across this much wider sensor.

Figure 1:
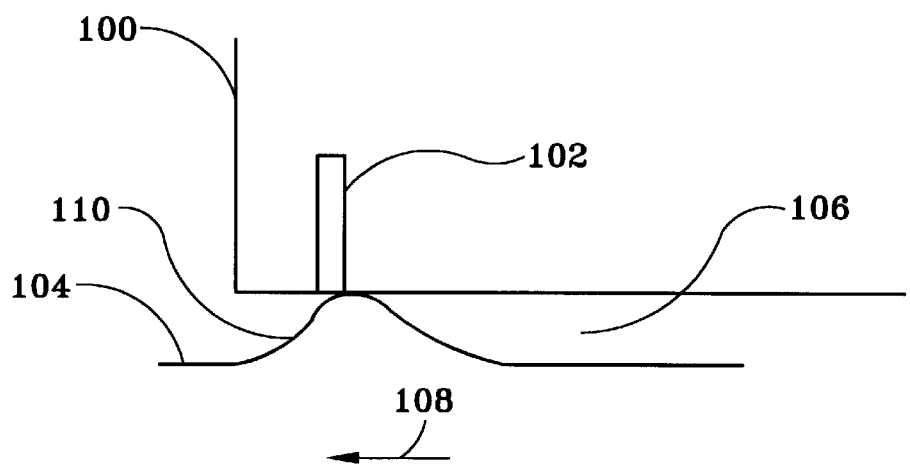
FIG. 1 is a simplified elevation view showing the component relationships that lead to contact thermal asperities.
Figure 2:
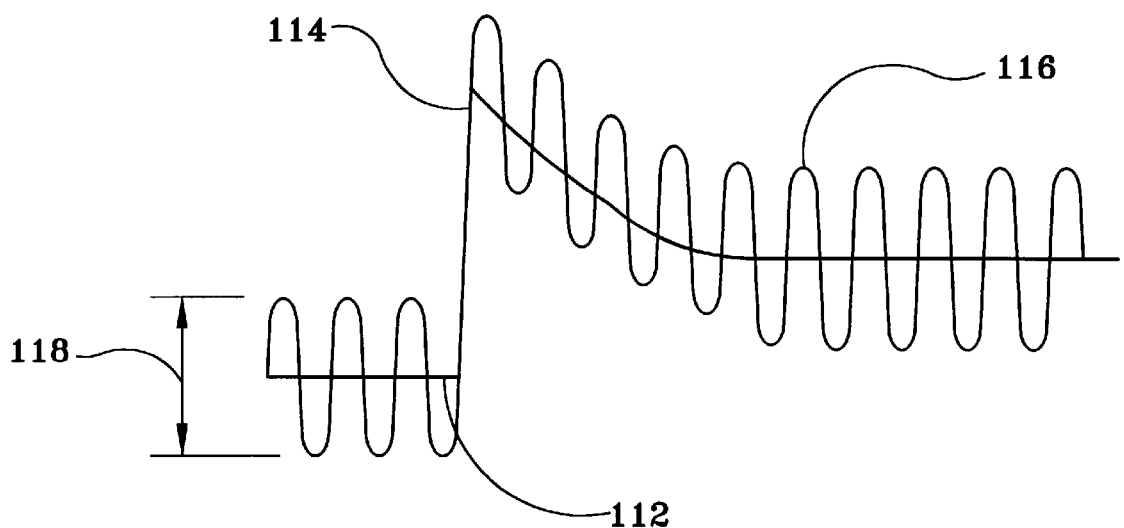
FIG. 2 is simple diagrammatic representation of the effect of contact thermal asperities on the data read channel of a disc drive.
Figure 3:
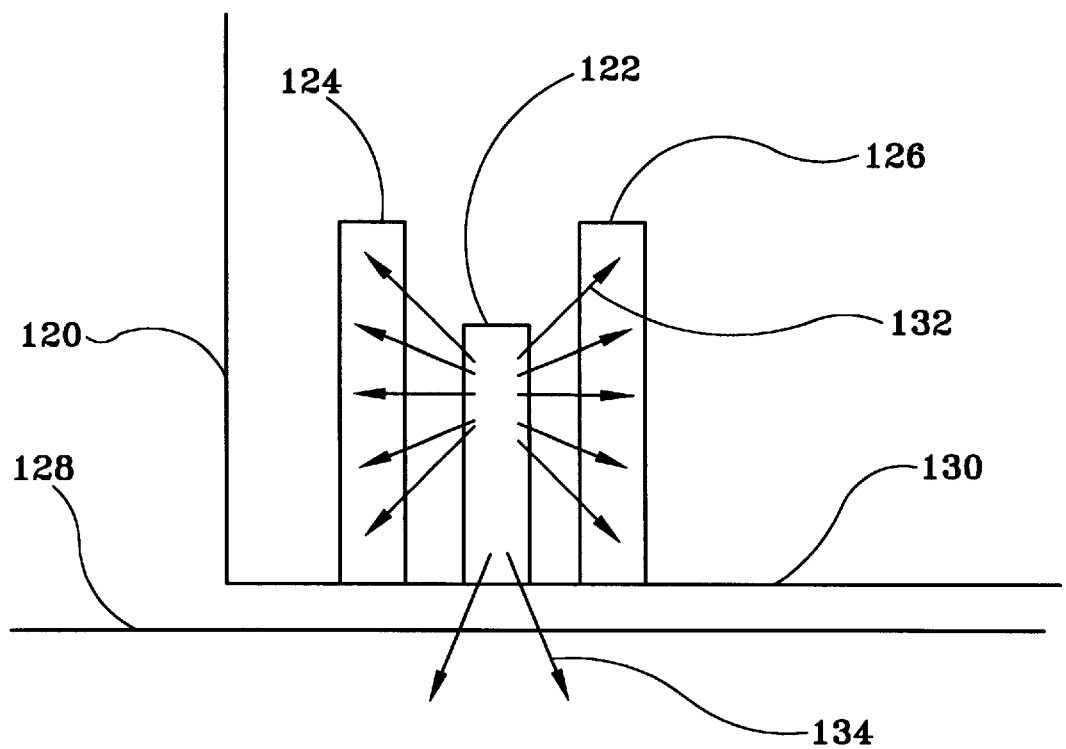
FIG. 3 is a simplified elevation view illustrating the thermal characteristics of a typical magneto-resistive read/write head.
Figure 4:
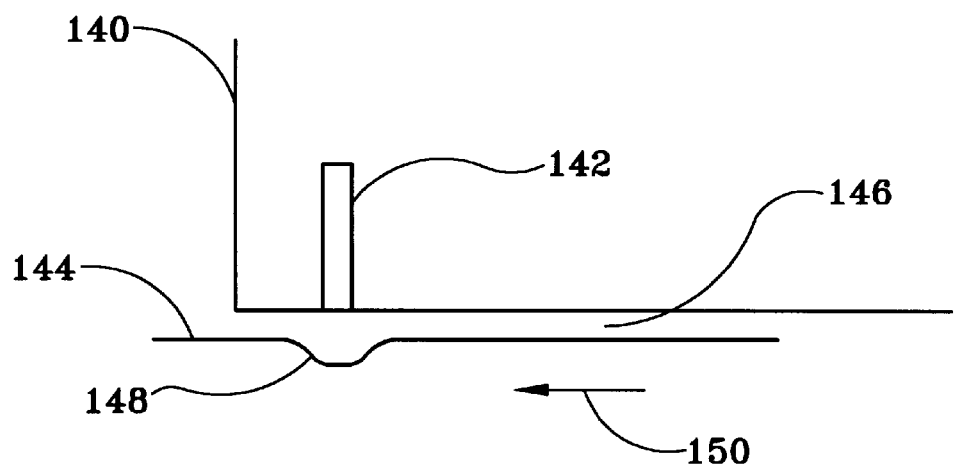
FIG. 4 is a simplified elevation view showing the component relationships that lead to positive non-contact thermal asperities.
Figure 5:
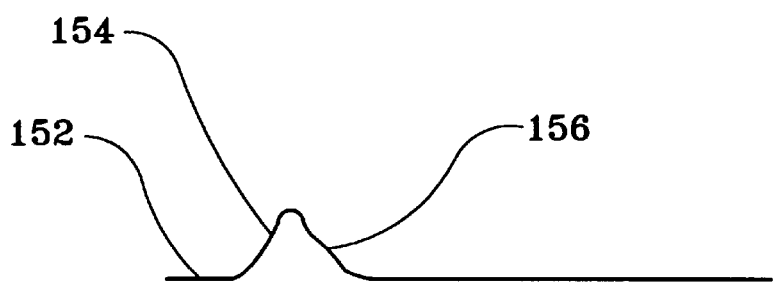
FIG. 5 is a simple diagrammatic representation of the effect of positive non-contact thermal asperities on the data read channel of a disc drive.
Figure 6:
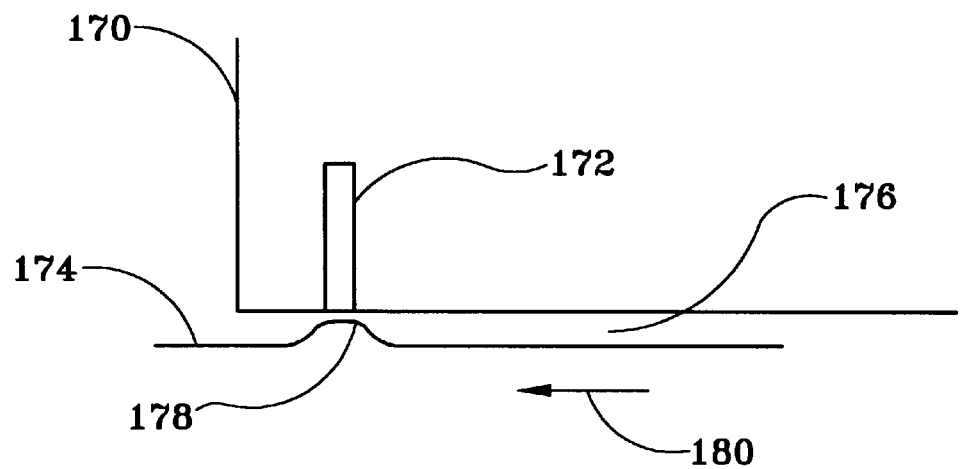
FIG. 6 is a simplified elevation view showing the component relationships that lead to negative non-contact thermal asperities.
Figure 7:
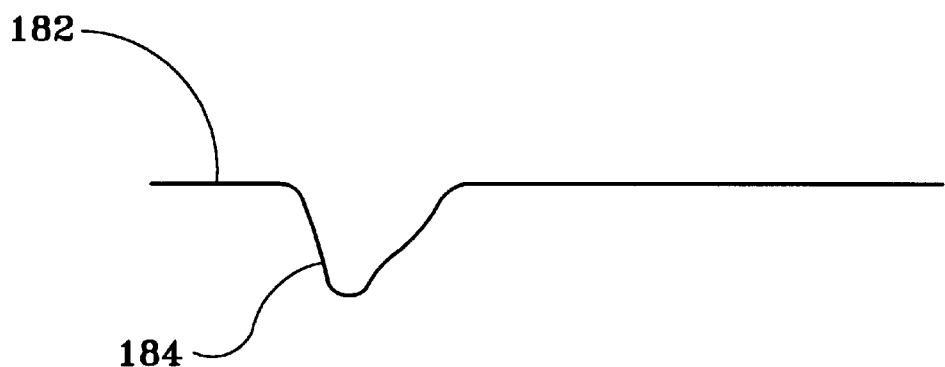
FIG. 7 is a simple diagrammatic representation of the effect of negative non-contact thermal asperities on the data read channel of a disc drive.

Magnetic certification and thermal asperity detection can be performed using the test head of the present invention in a test system similar to that of FIG. 9. In such a case, the media defect signal carried to the defect mapping logic (256 in FIG. 2) would consist of the outputs of the multiple differential amplifiers 290, 310 of FIGS. 13 and 15, and, optionally, the differential amplifiers 291, 312 of FIGS. 13 and 15 connected across the entire effective widths 288, 306 of the MR stripe, and the defect mapping logic 256 would also include the read data logic and thermal asperity detection logic described generally above.

One of skill in the art will also appreciate that, while the test head of the present invention can be used in the "step/dwell" mode described above in the discussion of FIG. 9, the inventive test head can also be used in a test system which operates in a "spiral" mode. That is, instead of stepping the actuator (136 in FIG. 9) in predetermined intervals and maintaining the test head at that radial position for sufficient time for testing to be completed at that radial position, the actuator can be moved at a constant velocity, selected as a function of the rotational rate of the spin motor (234 in FIG. 9), which moves the test head across the disc surface in a spiral manner. The pitch of the spiral path, and thus the linear velocity of the actuator, will be determined by the amount of disc surface coverage required to provide confidence in the overall disc screening process. The wide inductive write elements and individual "read elements" of the test head of the present invention are particularly well suited to this type of spiral testing, which also contributes to increase in the testing speed for each disc, increasing in turn the testing throughput and lowering testing costs.

In summary, the present invention provides a test head which is capable of simultaneous magnetic certification and thermal asperity detection. The test head of the present invention includes a wide MR stripe that spans the width of several of the data track widths of the disc drive in which the disc tested is intended for use. The entire effective width of the MR stripe of the test head of the present invention is divided into a plurality of certification test MR stripe segments by the inclusion of intermediary taps and lead connections along the width of the MR stripe, and it is currently envisioned that the certification test MR stripe segments used for magnetic certification will be comparable in width to the width of the MR read elements intended for use with the tested disc in a disc drive. Simultaneous monitoring of the certification test MR stripe segments enables magnetic certification of multiple track widths at the same time, and monitoring of the entire effective MR stripe width for the detection of "super pulses" provides simultaneous detection of thermal asperities on the disc surface.

From the foregoing, it is apparent that the present invention is particularly well suited and well adapted to achieve the functionality set forth hereinabove, as well as possessing other advantages inherent therein. While particular configurations of the present invention has been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A test head for magnetic certification of and thermal asperity detection on a magnetic recording disc, the disc intended for use in a disc drive with a nominal track width and nominal inter-track spacing, the test head comprising:

a magneto-resistive stripe having an overall effective width spanning a plurality of the nominal track widths and inter-track spacing therebetween;

a plurality of lead connections arranged to divide the magneto-resistive stripe effective width into a plurality of functional certification magneto-resistive certification test MR stripe segments of substantially the same width as the nominal track width; and a wide inductive write element capable of recording magnetic flux transitions on the disc across a plurality of the nominal track widths and nominal inter-track spacing.

2. A test system for magnetic certification of and thermal asperity detection on a magnetic recording disc, the disc intended for use in a disc drive with a nominal track width and nominal inter-track spacing, the test system comprising:

a spin motor for supporting and rotating the disc;

means for generating a disc position signal reflective of the angular position of the disc;

a test head comprising:
a magneto-resistive stripe having an overall effective width spanning a plurality of the nominal track widths and inter-track spacing therebetween;
a plurality of lead connections arranged to divide the magneto-resistive stripe overall effective width into a plurality of functional certification test magneto-resistive stripe segments, each of substantially the same width as the nominal track width; and
a wide inductive write element capable of recording magnetic flux transitions in a known test data pattern on the disc across a plurality of the nominal track widths and nominal inter-track spacing;

an actuator assembly for moving said thermal asperity test head assembly radially across the disc;

means for generating an actuator position signal reflective of the radial position of said test head assembly relative to the disc;

read data channel circuitry associated with each of the certification test magneto-resistive stripe segments, the read data channel circuitry capable of comparing data patterns recovered by the certification test magneto-resistive stripe segments and the known test data pattern recorded on the disc by the wide inductive write element and generating a certification error signal indicative of comparison failures, the read data channel circuitry further capable of monitoring for anomalous recovered data signals indicative of the passage of a thermal asperity beneath the overall effective width of the magneto-resistive stripe and generating a thermal asperity detection signal and generating a thermal asperity detection signal when such anomalous recovered data signals are detected; and defect mapping logic, responsive to said disc position signal, to said actuator position signal, to said certification error signal and to said thermal asperity detection signal, for mapping the location of detected certification errors and thermal asperities in the surface of the disc.

\* \* \* \* \*